United States Patent
Kasuya et al.

(10) Patent No.: US 10,861,185 B2
(45) Date of Patent: Dec. 8, 2020

(54) INFORMATION PROCESSING APPARATUS AND METHOD OF CONTROLLING THE SAME

(71) Applicant: CANON KABUSHIKI KAISHA, Tokyo (JP)

(72) Inventors: Nozomu Kasuya, Yokohama (JP); Makoto Tomioka, Kawasaki (JP); Masakazu Fujiki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/861,800

(22) Filed: Jan. 4, 2018

(65) Prior Publication Data

US 2018/0197308 A1 Jul. 12, 2018

(30) Foreign Application Priority Data

Jan. 6, 2017 (JP) .................................. 2017-001434

(51) Int. Cl.
*G06T 7/73* (2017.01)
*G06T 7/60* (2017.01)
(Continued)

(52) U.S. Cl.
CPC .................. *G06T 7/73* (2017.01); *G06T 7/50* (2017.01); *G06T 7/60* (2013.01); *H04N 13/204* (2018.05);
(Continued)

(58) Field of Classification Search
CPC .... G06T 7/73; G06T 7/55; G06T 7/60; G06T 7/70; G06T 7/246–248; G06T 7/62;
(Continued)

(56) References Cited

U.S. PATENT DOCUMENTS 8,144,238 B2 * 3/2012 Kotake ................ G06K 9/3216
348/239
8,401,225 B2 * 3/2013 Newcombe ............. G06T 7/194
382/100
(Continued)

FOREIGN PATENT DOCUMENTS

JP 5530391 B2 6/2014

OTHER PUBLICATIONS

Zhang. "A Flexible New Technique for Camera Calibration." IEEE Transactions on Pattern Analysis and Machine Intelligence. 2000: 1-21. vol. 22, No. 11. Cited in Specification.
(Continued)

*Primary Examiner* — Michael S Osinski
(74) *Attorney, Agent, or Firm* — Rossi, Kimms & McDowell LLP (57) ABSTRACT

An information processing apparatus inputs a plurality of detected features that are detected from an image or three-dimensional data, holds a plurality of features of a physical space as a plurality of held features in association with availabilities in a calculation of a position/orientation of an apparatus that obtained the image or the three-dimensional data, decides spatial locations of the held features in the image or the three-dimensional data, and decides, based on the availabilities of the held features existing in a vicinity of one detected feature out of the plurality of detected features at the locations, a state of usage of the one detected feature in the position/orientation calculation.

23 Claims, 8 Drawing Sheets

(51) Int. Cl.
*G06T 7/50* (2017.01)
*H04N 13/204* (2018.01)
*H04N 13/344* (2018.01)
*H04N 13/239* (2018.01)

(52) U.S. Cl.
CPC ......... *H04N 13/239* (2018.05); *H04N 13/344* (2018.05); *G06T 2207/10028* (2013.01)

(58) Field of Classification Search
CPC ........... G06T 7/20; G06T 7/215; G06T 7/223; G06T 7/50; G06T 2207/30244; G06T 2207/10028; G06T 2207/10016; G06T 2207/30204; G06K 9/00664; G06K 9/00671; G06K 9/46; G06K 9/6201; G06K 9/209; G06K 9/00711; G06K 9/00771; G06K 9/00785; H04N 19/139; H04N 19/159; H04N 19/176; H04N 19/521; H04N 13/221; H04N 13/264; H04N 13/204; H04N 13/344; H04N 13/239

See application file for complete search history.

(56) References Cited

U.S. PATENT DOCUMENTS

| | | | | |
|---|---|---|---|---|
| 8,842,163 | B2* | 9/2014 | Datta | H04N 13/264 348/44 |
| 8,953,847 | B2* | 2/2015 | Moden | G06T 7/70 382/106 |
| 8,965,133 | B2* | 2/2015 | Shiiyama | G06K 9/623 382/100 |
| 9,525,862 | B2* | 12/2016 | Benhimane | G06T 17/00 |
| 9,852,341 | B2* | 12/2017 | Zhou | G06T 7/246 |
| 9,964,955 | B2* | 5/2018 | Keivan | G05D 1/0246 |
| 10,026,155 | B1 | 7/2018 | Furukawa | G06T 11/60 |
| 10,055,013 | B2* | 8/2018 | Ramaswamy | G06F 3/04815 |
| 10,095,928 | B2* | 10/2018 | Beall | G06K 9/00671 |
| 10,347,001 | B2* | 7/2019 | Murphy-Chutorian | G06T 7/579 |
| 2007/0140529 | A1* | 6/2007 | Iwabuchi | G06T 7/231 382/107 |
| 2012/0281922 | A1* | 11/2012 | Yamada | H04N 5/23254 382/201 |
| 2013/0094713 | A1* | 4/2013 | Nanri | G01C 11/06 382/106 |
| 2013/0136184 | A1* | 5/2013 | Suzuki | H04N 19/159 375/240.16 |
| 2013/0294681 | A1* | 11/2013 | Nishimura | H04N 13/128 382/154 |
| 2014/0139674 | A1* | 5/2014 | Aoki | H04N 7/18 348/148 |
| 2014/0320682 | A1* | 10/2014 | Kuwabara | H04N 5/357 348/208.6 |
| 2015/0243016 | A1* | 8/2015 | Moteki | G06T 7/70 382/103 |
| 2015/0310624 | A1* | 10/2015 | Bulan | G06K 9/66 382/103 |
| 2017/0061641 | A1 | 3/2017 | Inoue | |
| 2017/0148175 | A1* | 5/2017 | Liu | H04N 5/247 |
| 2017/0177939 | A1* | 6/2017 | Beall | G06K 9/00671 |
| 2018/0084274 | A1* | 3/2018 | Furukawa | H04N 19/43 |
| 2018/0095347 | A1* | 4/2018 | Takahashi | G09G 5/00 |
| 2018/0095549 | A1* | 4/2018 | Watanabe | G06K 9/00201 |
| 2018/0197307 | A1* | 7/2018 | Tomioka | G06K 9/00664 |
| 2018/0262754 | A1* | 9/2018 | Komi | H04N 19/139 |
| 2018/0336688 | A1* | 11/2018 | Narita | G06T 7/248 |
| 2018/0339386 | A1* | 11/2018 | Lee | G01S 5/16 |
| 2019/0052806 | A1* | 2/2019 | Wada | H04N 5/23293 |
| 2019/0080466 | A1* | 3/2019 | Mori | G06T 7/593 |
| 2019/0122370 | A1* | 4/2019 | Hayashi | G06T 7/20 |
| 2019/0155302 | A1* | 5/2019 | Lukierski | G06T 17/00 |
| 2019/0230360 | A1* | 7/2019 | Koyama | H04N 19/105 |

OTHER PUBLICATIONS

Kato et al. "Marker Tracking and HMD Calibration for a Video-Based Augmented Reality Conferencing System." Faculty of Information Sciences, Hiroshima City University. Human Interface Technology Laboratory, University of Washington. 1999. Cited in Specification.

Shi et al. "Good Features to Track." IEEE Conference on Computer Vision and Pattern Recognition. Jun. 1994. Seattle. Cited in Specification.

Badino et al. "A Head-Wearable Short-Baseline Stereo System for the Simultaneous Estimation of Structure and Motion." 12th IAPR Conference on Machine Vision Applications. Jun. 13-15, 2011. Nara, Japan. Cited in Specification.

Klein et al. "Parallel Tracking and Mapping for Small AR Workspaces." Active Vision Laboratory, Department of Engineenng Science, University of Oxford. 2007. Cited in Specification.

Kotake et al. "A Fast Initialization Method for Edge-based Registration Using an Inclination Constraint." ISMAR. IEEE Xplore. Dec. 2007. Cited in Specification.

Korkalo et al. "Real-time depth camera tracking with CAD models and ICP." Journal of Virtual Reality and Broadcasting. 2016. vol. 13, No. 1. Cited in Specification.

Lowe. "Distinctive Image Features from Scale-Invariant Keypoints." International Journal of Computer Vision. Jan. 5, 2004: 1-28. Cited in Specification.

Tomasi et al. "Detection and Tracking of Point Features." Technical Report CMU-CS-91-132. Apr. 1991: 1-20. Cited in Specification.

Long et al. "Fully Convolutional Networks for Semantic Segmentation." IEEE Transaction on Pattern Analysis and Machine Intelligence, vol. 39, pp. 640-651, 2017. Cited in NPL 11.

Copending U.S. Appl. No. 15/861,764, filed Jan. 4, 2018.

Notice of Allowance issued in U.S. Appl. No. 15/861,764 dated Nov. 8, 2019.

Notice of Allowance issued in U.S. Appl. No. 15/861,764 dated May 4, 2020.

Notice of Allowance issued in U.S. Appl. No. 15/861,764 dated Aug. 10, 2020.

* cited by examiner

INFORMATION PROCESSING APPARATUS AND METHOD OF CONTROLLING THE SAME

BACKGROUND OF THE INVENTION

Field of the Invention

The present invention relates to an information processing apparatus for measuring a position/orientation of an image capturing apparatus, and a method of controlling the same.

Description of the Related Art

Measurement of the position/orientation of an image capturing apparatus based on image information is used for various purposes such as alignment of a virtual object with a physical space in a mixed reality/an augmented reality, a self-position estimation by an automobile or a robot, and three-dimensional modeling of an object or a space.

Japanese Patent No. 5530391 discloses a method of measuring, in a scene where an object that moves exists in a physical space, a position/orientation at a time of image capture by using feature points detected from an image. In this method, it is determined whether a feature point on a three-dimensional map is a feature point on a moving object, and a moving object flag is set to 1 if the feature point is on the moving object. When an image captured by an image capturing apparatus is inputted, feature points in a three-dimensional map corresponding to feature points detected from the captured image are searched for. The position/orientation of the image capturing apparatus is calculated in accordance with a robust estimation that uses all pairs of a feature point on the three-dimensional map where the moving object flag is 0 and the corresponding feature point detected from the captured image. A determination is made for whether a feature point determined to be an outlier at the time of the robust estimation is a moving object by obtaining a movement vector after making a projection onto the captured image based on the calculated position/orientation. The moving object flag of a feature point on the three-dimensional map that has been determined to be a moving object is updated to 1.

In Japanese Patent No. 5530391, there is the possibility that, out of feature points detected from an image captured by an image capturing apparatus, a feature point inappropriate for a position/orientation calculation of a moving object will be mistakenly associated with a feature point whose moving object flag in the three-dimensional map is 0, and used in a position/orientation calculation. As a result, there is a problem in that the precision and stability of the position/orientation is low.

SUMMARY OF THE INVENTION

By virtue of an embodiment of the present invention, precision and stability in calculation of the position/orientation of an image capturing apparatus improves irrespective of the existence of a moving object in a range that the image capturing apparatus captured.

According to one aspect of the present invention, there is provided an information processing apparatus, comprising: an input unit configured to input a plurality of detected features that are detected from an image or three-dimensional data; a holding unit configured to hold a plurality of features of a physical space as a plurality of held features in association with availabilities in a calculation of a position/orientation of an apparatus that obtained the image or the three-dimensional data; a location deciding unit configured to decide spatial locations of the held features in the image or the three-dimensional data; and a deciding unit configured to decide, based on the availabilities of the held features existing in a vicinity of one detected feature out of the plurality of detected features at the locations decided by the location deciding unit, a state of usage of the one detected feature in the position/orientation calculation.

Also, according to one aspect of the present invention, there is provided a method of controlling an information processing apparatus, the method comprising: inputting a plurality of detected features that are detected from an image or three-dimensional data; holding in a memory a plurality of features of a Physical space as a plurality of held features in association with availabilities in a calculation of a position/orientation of an apparatus that obtained the image or the three-dimensional data; deciding spatial locations of the held features in the image or the three-dimensional data; and deciding, based on the availabilities of the held features existing in a vicinity of one detected feature out of the plurality of detected features at the decided locations, a state of usage of the one detected feature in the position/orientation calculation.

Further features of the present invention will become apparent from the following description of exemplary embodiments (with reference to the attached drawings).

DESCRIPTION OF THE EMBODIMENTS

Explanation of embodiments of the present invention is given below with reference to the attached drawings.

First Embodiment

In the first embodiment, explanation is given regarding measurement of a position/orientation of an image capturing apparatus in a physical space. The position/orientation of the image capturing apparatus in the physical space is, for example, used to align a virtual object with the physical space in a mixed reality system, in other words for rendering of the virtual object. A user who experiences the mixed reality wears a head-mounted display (hereinafter, an HMD (Head-Mounted Display)) to thereby observe through the HMD the physical space onto which virtual objects are superimposed. A stereo camera is mounted to the HMD as an image capturing apparatus, and a user is presented with a result of superimposing an image of a virtual object rendered, based on the position/orientation in the physical space of the stereo camera, on the image captured by the stereo camera.

In the present embodiment, image feature points detected from the image captured by the image capturing apparatus are used in the calculation of the position/orientation of the image capturing apparatus. A "feature point" is a point that indicates a geometric structure such as a corner or the like in an image. Firstly, a feature point (a detected feature point) detected in an image captured at a time t (a current frame) is associated with a feature point on an image captured at a time t-a which is before the current frame (a previous frame). Note that a feature point of a previous frame is held as a held feature point. A held feature point is associated with information (for example three-dimensional coordinates in a world coordinate system) indicating a position in the physical space. The position/orientation of the image capturing apparatus (with respect to the world coordinate system) is calculated based on the two-dimensional position on the image of the feature point (the detected feature point) of the current frame, and the feature point (the held feature point) of the previous frame. In the calculation of the position/orientation of the image capturing apparatus, only feature points for which it is possible to stably and with high precision calculate the position/orientation are selected and used.

For the held feature point, availability information which is an index indicating whether the stability and the precision will increase or decrease when the feature point is used for a position/orientation calculation of the image capturing apparatus is linked. In other words, the availability represents a degree to which the feature point should be used in a position/orientation calculation of an apparatus. In the embodiment, availability information is a history of determination results for whether the corresponding feature point was a moving object before the time t. Specifically, availability information is an index determined in accordance with a degree of matching with movement of the image capturing apparatus, based on a calculated position/orientation, and holds a value of 0 or 1 in the present embodiment. It is possible to stably and with high precision calculate a position/orientation by selecting and using a feature point that matches the movement of the camera before the time t. In the present embodiment, when selecting a feature point to be used in calculation of a position/orientation, a feature point whose vicinity includes many feature points having a low availability (have a high possibility of being a moving object) are also excluded from the calculation of the position/orientation of an image capturing apparatus. By this, it is even more possible to stably and with high precision calculate the position/orientation.

The position/orientation of the image capturing apparatus in the first embodiment is expressed by six parameters combining three parameters that represent the orientation of the image capturing apparatus, and three parameters that represent the position of the image capturing apparatus in global coordinates defined in the physical space. In the following embodiments including the first embodiment, unless particular explanation is given, the position/orientation of a left-side camera of a stereo camera is referred to as the position/orientation of the image capturing apparatus. In addition, a three-dimensional coordinate system defined with respect to the image capturing apparatus in which the optical axis of the image capturing apparatus is the Z-axis, a horizontal direction of the image is the X axis, and the vertical direction thereof is the Y axis is referred to as a camera coordinate system. In the present embodiment, unless specifically stated otherwise, a feature point indicates a feature point detected in an image of the camera of the left-side, and the position of the feature point is expressed by two parameters that represent a two-dimensional position of an image coordinate system in which abscissa of the image of the left-side camera is the x axis and the ordinate is the y axis.

Figure 1A:
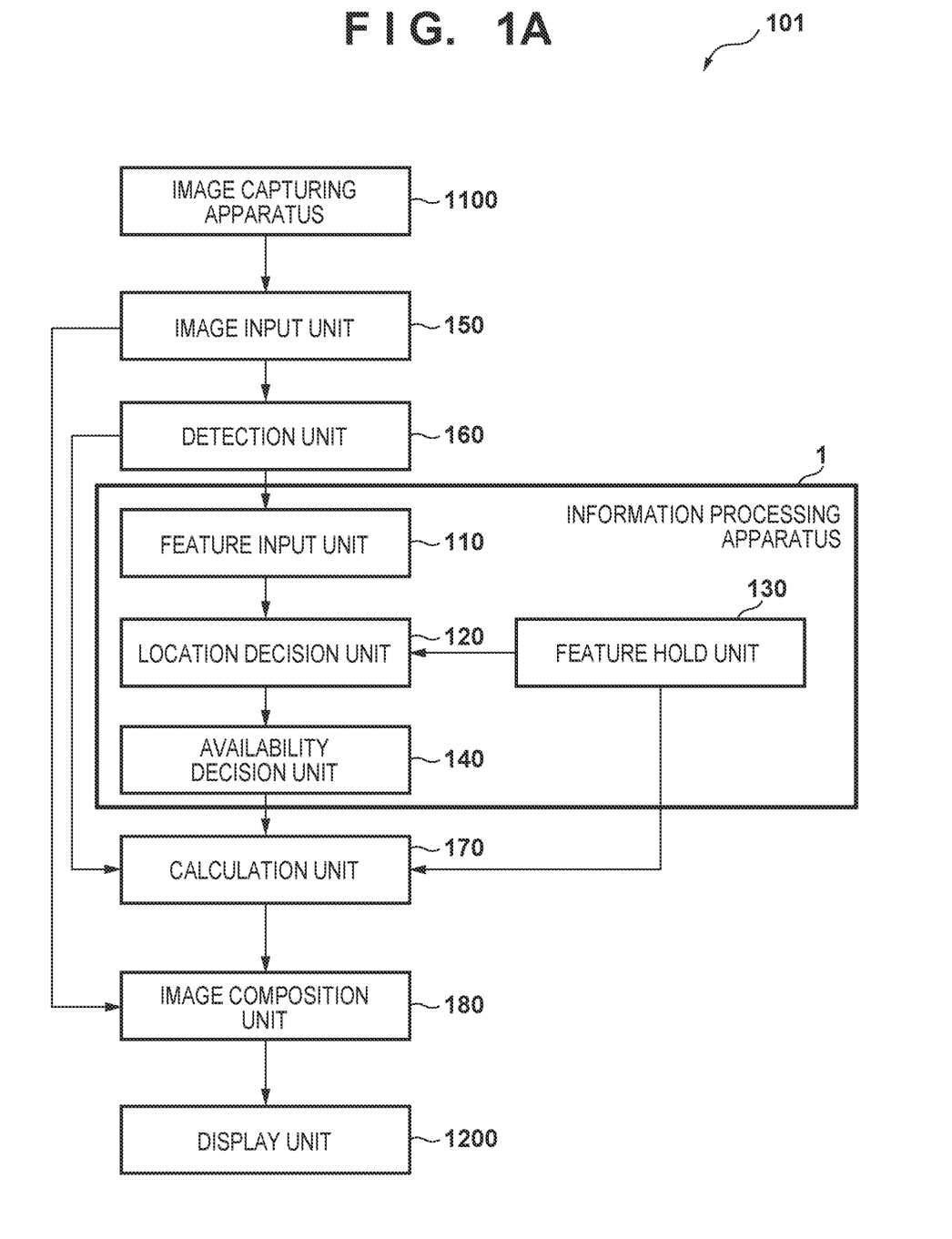
FIG. 1A is a block diagram illustrating an example of a functional configuration of an information processing apparatus in a first embodiment.
Figure 1B:
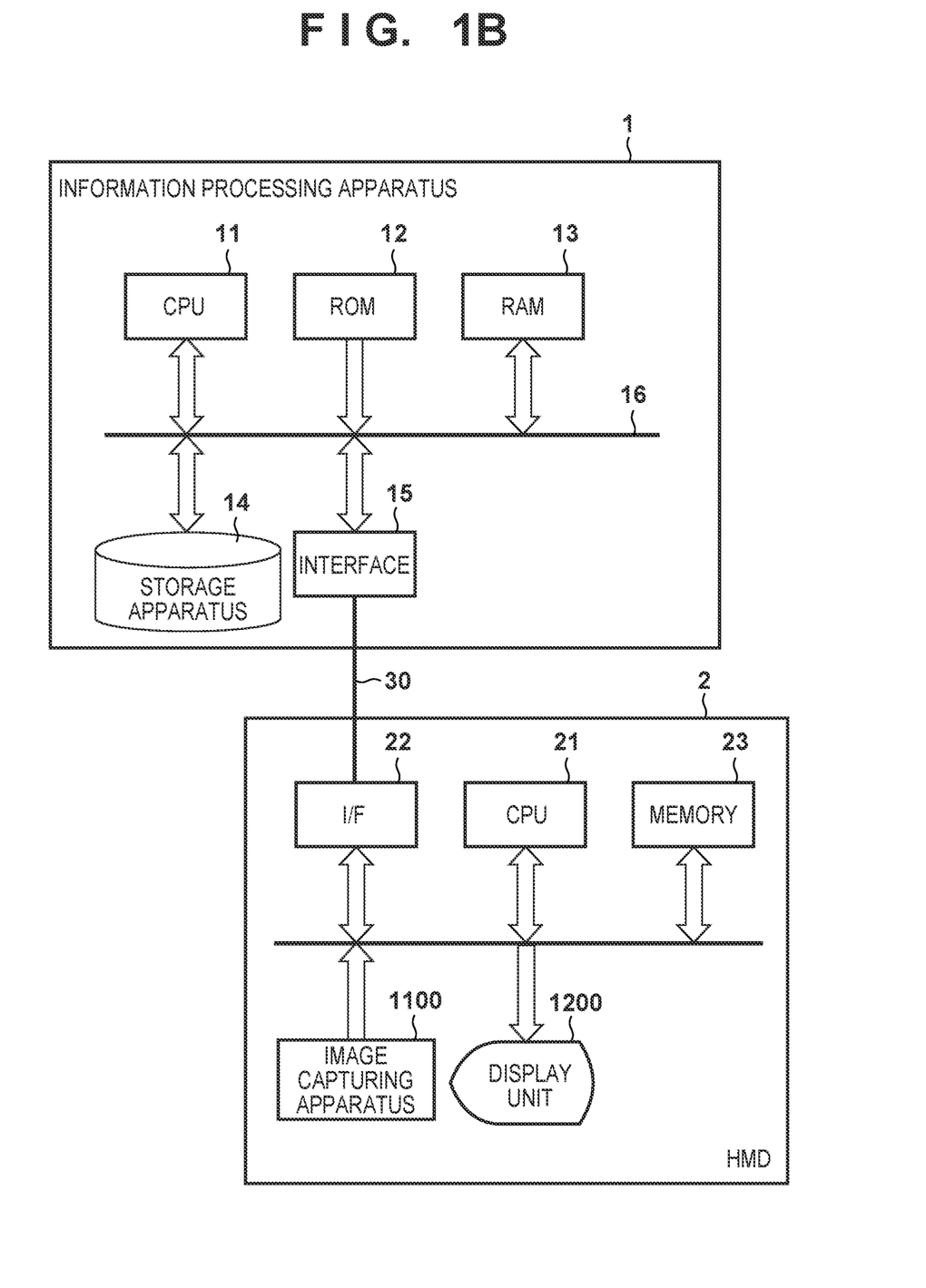
FIG. 1B is a block diagram illustrating an example of a hardware configuration of an information processing apparatus in the first embodiment.

FIG. 1A is a block diagram illustrating an example of a functional configuration of an image processing system 101 in this embodiment. In FIG. 1A, the image processing system 101 has an information processing apparatus 1, an image input unit 150, a detection unit 160, a calculation unit 170, and an image composition unit 180. The information processing apparatus 1 is provided with a feature input unit 110, a location decision unit 120, a feature hold unit 130, and an availability decision unit 140. The image input unit 150 is connected to an image capturing apparatus 1100 that is mounted to an HMD. In the embodiment, the image capturing apparatus 1100 is a stereo camera. The image composition unit 180 is connected to a display unit 1200 that is mounted to HMD 2 (FIG. 1B).

The image input unit 150 is inputted with images captured by the image capturing apparatus 1100 in chronological order (for example, 60 frames a second), and supplies the inputted images to the detection unit 160, and the image composition unit 180. The detection unit 160 detects feature points on an image inputted by the image input unit 150. The detection unit 160 supplies the detected feature points to the calculation unit 170 and the feature input unit 110.

The feature input unit 110 receives the feature points detected by the detection unit 160, and inputs them to the location decision unit 120. The location decision unit 120 associates a feature point of the previous frame that is held by the feature hold unit 130 with a feature point of the current frame that is inputted from the feature input unit 110, and decides a location for the feature point of the previous frame in the current frame. The feature hold unit 130 holds a plurality of feature points of the Physical space as a plurality of held feature points in association with availabilities that represent a degree to which they should be used in a calculation of the position/orientation of the image capturing apparatus 1100 which obtained the image. The availability decision unit 140 decides the availability of a detected feature point of the current frame by using the location of the held feature point that was decided by the location decision unit 120, and availability information of a feature point that is held by the feature hold unit 130. In the present embodiment, whether to permit usage in a position/orientation calculation for each detected feature is decided based on the availability of a held feature point that exists in the vicinity of the detected feature. The availability decision unit 140 outputs the availability of feature points of the current frame to the calculation unit 170.

The calculation unit 170 calculates the position/orientation of the image capturing apparatus 1100, based on availabilities of features of the current frame that are decided by the availability decision unit 140, and relatedness between feature points of the current frame that are detected by the detection unit 160 and feature points of the previous frame that are held by the feature hold unit 130. The image composition unit 180 renders a CG image of a virtual object by using the position/orientation of the image capturing apparatus 1100 calculated by the calculation unit 170, and internal/external parameters of the image capturing apparatus 1100. As a result, a CG image is composited with a captured image that is inputted from the image input unit 150. The display unit 1200 is mounted to the HMD 2, and the image composition unit 180 displays the composited image. In the present embodiment the HMD 2 is a stereo HMD, and by displaying different images to left and right display devices enables stereoscopic viewing of a physical space and a virtual object by a user.

FIG. 1B is a block diagram illustrating an example of a hardware configuration of the image processing system 101 in the first embodiment. In the information processing apparatus 1, a CPU 11 executes a program stored in a ROM 12 or a RAM 13 to thereby realize functions, various processes, and control of the information processing apparatus 1. The ROM 12 is a read-only non-volatile memory, and the RAM 13 is a volatile memory capable of being dynamically read from or written to. A storage apparatus 14 is a large capacity storage medium such as a hard disk. An interface 15 connects an external device to the information processing apparatus 1. Each of the above configurations are connected so as to allow mutual communication by a bus 16.

Meanwhile, in the HMD 2, a CPU 21 executes a program stored in a memory 23 to thereby realize functions, various processing and control of the HMD 2. An interface 22 connects an external device to the HMD 2. The image capturing apparatus 1100 and the display unit 1200 are as explained above in relation to FIG. 1A. Each above unit in the HMD 2 is connected to allow mutual communication via a bus 24. A connection 30 for connecting the interface 15 and the interface 22 may be a wired connection or may be a wireless connection. The connection 30 may be a connection via a wired LAN or a wireless LAN.

Note that, in FIG. 1A, the image input unit 150, the detection unit 160, the calculation unit 170, and the image composition unit 180 are illustrated as configurations (functions) external to the information processing apparatus 1, but these may be realized by the information processing apparatus 1, or may be realized by the HMD 2.

Figure 2:
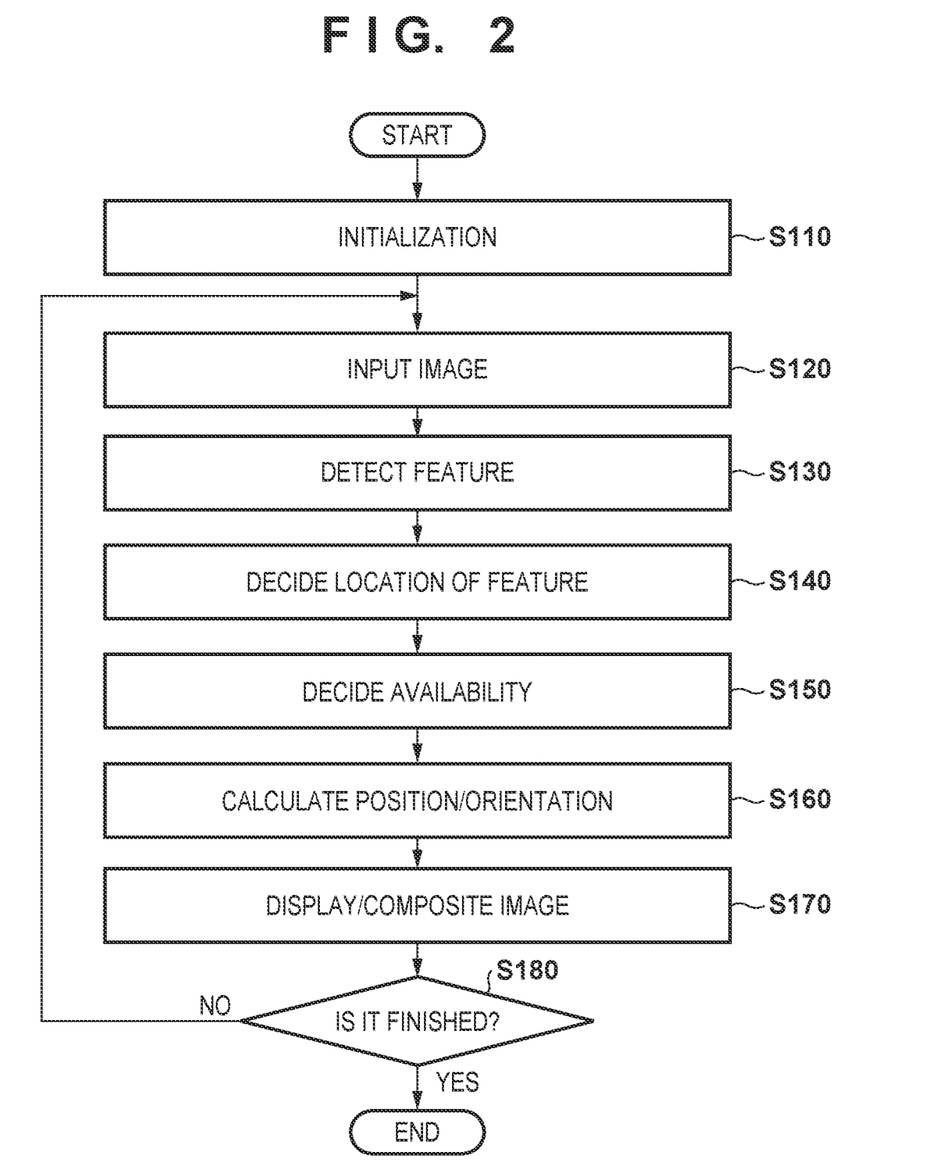
FIG. 2 is a flowchart illustrating a procedure for processing in the first embodiment.

Next, explanation is given regarding a procedure for video processing of the first embodiment, in which a configuration as above is provided. FIG. 2 is a flowchart illustrating a procedure for video processing in the first embodiment.

In step S110 (initialization processing), the information processing apparatus 1 performs initialization processing. In the initialization processing, the information processing apparatus 1 reads internal parameters of the image capturing apparatus 1100, and calculates an initial position/orientation of the image capturing apparatus 1100, for example. The internal parameters of the image capturing apparatus 1100 (a focal distance, an image center position, and a lens distortion parameter) are calibrated in advance in accordance with Zhang's method (Z. Zhang, "A flexible new technique for camera calibration," IEEE Trans. on Pattern Analysis and Machine Intelligence, vol. 22, no. 11, pp. 1330-1334, 2000. (D1)). In addition, the information processing apparatus 1 obtains the relative position/orientation (an external parameter) between the two cameras that configure the image capturing apparatus 1100 which is a stereo camera as follows, for example. The information processing apparatus 1 obtains the position/orientation of each camera based on patterns from images obtained by capturing a pattern that has a known three-dimensional shape by the left and right cameras at the same time. The information processing apparatus 1 obtains the relative position/orientation between the two cameras by converting the position/orientation of the right camera to a position/orientation based on the left camera. Initial values $t_{w \to t(t=0)}$ and $R_{w \to t(t=0)}$ of the position/orientation with respect to the world coordinate system of the image capturing apparatus 1100 can be calculated in accordance with, for example the method by Kato et al. (H. Kato and M. Billinghurst, "Marker tracking and hmd calibration for a video-based augmented reality conferencing system," International Workshop on Augmented Reality, 1999. (D2)) which uses synthetic markers that have a known size.

In step S120 (image input processing), the image input unit 150 is inputted with a stereoscopic image captured by the image capturing apparatus 1100. In the present embodiment, because the image capturing apparatus 1100 captures a color image, the image input unit 150 converts the inputted image to a grayscale image, and also uses the internal parameters of the left and right cameras to convert it to an image from which the influence of lens distortion is removed. In step S130 (feature point detection processing), the detection unit 160 detects a feature point on the image (the current frame) inputted by the image input unit 150. Detecting a feature point is possible by using the method by Shi et al. (J. Shi and C. Tomasi, Good Features to Track, Proc. CVPR1994. (D3)), for example. The detection unit 160 performs stereo matching for a feature point to calculate the depth of the detected feature point.

In step S140 (processing for deciding feature location), the location decision unit 120 associates, in accordance with feature point matching, a feature point of the previous frame held by the feature hold unit 130, and the feature point of the current frame detected in step S130. Below, a feature point of a previous frame that is held by the feature hold unit 130 is referred to as a held feature point, and a feature point of the current frame that is detected in step S130 is referred to as a detected feature point. The location decision unit 120 decides a location in the current frame for the held feature point. In the feature point matching, the location decision unit 120 calculates a normalized cross-correlation (SSD) of pixels around the two feature points, and, if a calculated value is less than or equal to a threshold value $M_{th}$, treats the two feature points as being the same position on the same object, for example.

In step S150 (processing for deciding availability), the availability decision unit 140 decides, for each feature point, an availability for a calculation of the position/orientation. The availability decision unit 140 searches the feature hold unit 130 for a held feature point existing in the vicinity of the detected feature point, out of locations decided in step S140. A feature point in the vicinity of a detected feature point indicates a feature point whose Euclidean distance on the image is within a threshold value $N_{th}$ from the target detected feature point, and whose depth difference from the target detected feature point is within a threshold value $D_{th}$. In a case where, out of held feature points found in the vicinity, a ratio of held feature points whose availability value is 0 is greater than or equal to a threshold value $R_{th}$, the availability value of the target detected feature point is decided as 0 (usage prohibited), and otherwise it is decided as 1 (usage possible). In addition, the availability value is set to 0 for a detected feature point for which an associated held feature point is not found and a location is not decided in step S140. The foregoing processing is performed for all detected feature points. In this way, when there are more held feature points in the vicinity of the detected feature point whose respective availability information is less than a predetermined value than a predetermined ratio, it is decided that the detected feature point cannot be used in a position/orientation calculation.

In step S160 (position/orientation calculation processing), the calculation unit 170 uses a detected feature point whose availability is decided as 1 in step S150 to calculate the position/orientation of the image capturing apparatus 1100 that captured the current frame. As the position/orientation of the image capturing apparatus 1100, the calculation unit 170 calculates $R_{(t-1) \to t}$ which is a 3×3 rotation matrix representing the orientation and $t_{(t-1) \to t}$ which is a three-dimensional vector representing the position of the image capturing apparatus 1100 for the current frame with respect to the previous frame. Calculation of the position/orientation of the image capturing apparatus 1100 is possible by using the method of Badino et al. (H. Badino and T. Kanade, "A Head-Wearable Short-Baseline Stereo System for the Simultaneous Estimation of Structure and Motion", Proc. MVA, 2011 (D4)), for example. In addition, the position/orientation $t_{w \to t}$, $R_{w \to t}$ of the image capturing apparatus 1100 with respect to the world coordinate system is calculated by adding the position/orientation $t_{(t-1) \to 1}$, $R_{(t-1) \to t}$ of the image capturing apparatus 1100 with respect to the camera coordinates of the previous frame to the position/orientation $t_{w \to (t-1)}$, $R_{w \to (t-1)}$ of the image capturing apparatus 1100 with respect to the world coordinate system calculated at the previous frame.

In step S170 (image composition/display processing), the image composition unit 180 uses the position/orientation of the image capturing apparatus 1100 that was derived in step S150 to render a CG image of the virtual object. The image composition unit 180 then superimposes and composites the CG image on each image of the stereoscopic image obtained by the image capturing apparatus 1100 and displays to the display unit 1200 of the HMD 2.

In step S180 (end determination processing), the information processing apparatus 1 determines whether to end the system. The system ends when a user has inputted a command for ending the system via a mouse, keyboard, or the like, and otherwise the processing returns to step S120, and the processing for measuring position/orientation is continued.

As described above, by virtue of the first embodiment, configuration is such that a feature point whose vicinity includes many feature points determined to be features on a moving object (feature points whose availability value is 0) is not used in calculation of a position/orientation. By this, it is possible to stably and with high precision calculate the position/orientation even in a scene were a moving object exists.

<Variation 1-1>

The image capturing apparatus 1100, which captures images, is not limited to a stereo camera, and may be a camera that captures images of a physical space. For example, the image capturing apparatus 1100 may be configured by a monocular camera, and may be configured by three or more cameras for which relative position/orientation is known beforehand. In addition, the image capturing apparatus 1100 is not limited to a camera that captures a color image, and may be a camera that captures a grayscale image, or may be a camera that captures depth information. However, in the case of using a monocular camera, because depth is necessary when calculating a position/orientation and when deciding availability, it is necessary to calculate the depth from movement of the camera by using the method of Klein et al. (G. Klein and D. Murray, "Parallel tracking and mapping for small AR workspaces," Proc. ISMAR, pp. 225-234, 2007 (D5)), for example. In addition, an image capturing apparatus for capturing an image for calculating a position/orientation and an image capturing apparatus for capturing an image to which CG is composited may be the same apparatus or may be different apparatuses.

<Variation 1-2>

In the first embodiment, a feature point is used as an image feature. However, it is sufficient if an image feature is something from geometric information of an image by which it is possible to calculate the position/orientation of the image capturing apparatus 1100. An edge in the image may be used as an image feature, as in the method of Kotake et al. (D. Kotake, K. Satoh, S. Uchiyama, and H. Yamamoto: "A fast initialization method for edge-based registration using an inclination constraint", Proc. ISMAR 2007 (D6), for example. In such a case, the geometric attribute of an image feature held by the feature hold unit 130 may be two-dimensional positions of both end points of an edge on an image, for example. In addition, configuration may be taken to set the three-dimensional model of an object as an image feature, and use the method of Korkalo et al. (O. Korkalo and S. Kahn, "Real-time depth camera tracking with CAD models and ICP", JVRB, Vol. 13, No. 1, 2016 (D7)) for obtaining the position/orientation of the image capturing apparatus 1100 by comparing the model and an input image. In addition, configuration may be taken to use a marker as an image feature instead of a three-dimensional model, and use the method of Kato et al. (D2) which is position and orientation estimation based on a marker.

<Variation 1-3>

In the first embodiment, matching of feature points in accordance with normalized cross-correlation is used in the processing for deciding feature location of step S140. However, a method that can be used in deciding the location of a held feature and a detected feature is not limited to this, and it is sufficient if a method can find an association relationship for feature points between images. Matching of SIFT feature amounts which is the method of Lowe (D. G. Lowe: "Distinctive Image Features from Scale-Invariant Keypoints", International Journal of Computer Vision, Vol. 60, pp. 91-110, 2004 (D8)) may be used, for example. In addition, feature amount recitation may be used, for example. In addition, the location of a feature in a current frame may be calculated (tracked) directly from the feature of a previous frame as in the method of Tomasi et al. (C. Tomasi and T. Kanade, "Detection and Tracking of Point Features", Carnegie Mellon University Technical Report CMU-CS-91-132, 1991 (D9)), for example. In addition, the location may be decided by predicting movement of a feature by using an inertia sensor or the like. In such a case, it is necessary to associate a held feature and an input feature again when performing the position/orientation calculation in step S160. A method of association may use normalized cross-correlation as described above, and may use a feature amount such as SIFT.

<Variation 1-4>

In addition, in the first embodiment, values that availability of each held feature can take are explained as limited to 0 or 1, but there is no necessity for availability to be binary, and availability may be held as a real number value from 0 to 1. In such a case, when deciding the availability in step S150, configuration may be taken to calculate an average of availability held by held features found in the vicinity, and decide 1 if the calculated average value is greater than or equal to a threshold value, and otherwise decide 0.

In addition, the calculated average value (the availability of the detected feature) may be used as a weight when calculating the position/orientation in step S160. For example, configuration may be taken so that the availability value is set as the weight as is, or the weight is set to 0 if the availability value is less than or equal to a predetermined threshold value and the availability value is set as the weight as is if the availability value is greater than or equal to the threshold value. Of course, configuration may be taken so as to convert the availability value to a weight value in accordance with a predetermined rule. In a position/orientation calculation, a contribution by a feature point is adjusted based on the added weight.

<Variation 1-5>

In the first embodiment, a camera for capturing an image is used as the image capturing apparatus 1100, but, for example, a ToF (Time of Flight) sensor or a range finder that can obtain three-dimensional data may be used as the image capturing apparatus 1100. In such a case, in the detection of a feature point in step S130, configuration may be taken such that a feature point is randomly selected from the three-dimensional data, or a feature point that is a key point is selected from the three-dimensional data in accordance with some kind of policy. Alternatively, all of the inputted three-dimensional data may be used as a feature point. In addition, in step S140, the location may be decided in accordance with matching that uses a three-dimensional feature descriptor such as a SHOT feature, and the location may be decided by using ICP (Iterative Closest Point).

<Variation 1-6>

In the first embodiment, input of an image to the image input unit 150 is performed directly from the image capturing apparatus 1100, but there is no limitation to this. Configuration may be such that the image input unit 150 reads data stored in a file.

<Variation 1-7>

A configuration may be provided for a user to set various threshold values used in the first embodiment. As threshold values that a user can set, for example:

the threshold value $M_{th}$ for determining whether to treat a feature point as the same in feature point association on an image (step S140);

the threshold value $D_{th}$ for depth difference and the threshold value $N_{th}$ for distance on two-dimensional image when searching the vicinity (step S150); and the threshold value $R_{th}$ for when deciding the availability of an input feature in accordance with the availabilities of held features in the vicinity (step S150); and the like may be given.

Figure 3:
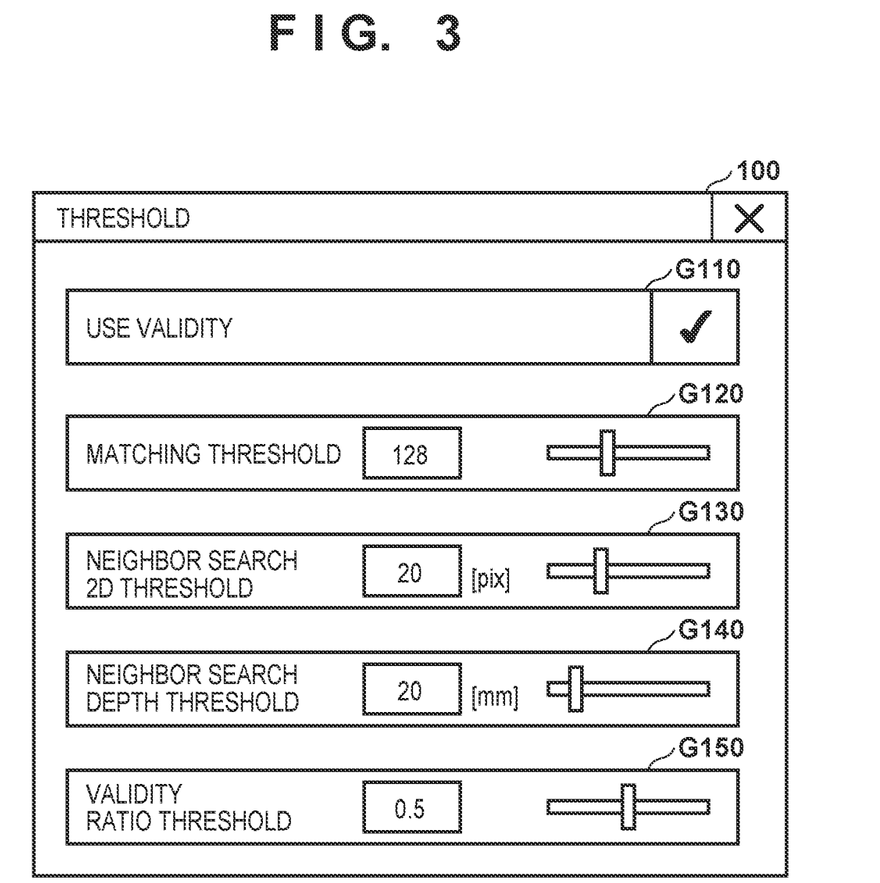
FIG. 3 is a view illustrating an example of a GUI for setting a threshold value in the first embodiment.

In the initialization processing of step S110, the information processing apparatus 1 may read these threshold values from an external storage apparatus, or a user may be allowed to set them via a predetermined GUI, for example. Such a GUI may be realized by a display that the information processing apparatus 1 is provided with, for example. FIG. 3 illustrates a display example of this GUI. A GUI 100 includes a switching button G110 for switching whether or not the availability information is to be used. In addition, the GUI 100 has a slider G120 for setting the threshold value $M_{th}$ for feature point matching, a slider G130 for setting the threshold value $N_{th}$ for vicinity searching, a slider G140 for setting the depth difference threshold value $D_{th}$, and a slider G150 for setting the threshold value $R_{th}$ for deciding availabilities for the vicinity. The location decision unit 120 and the availability decision unit 140 change corresponding threshold values upon detecting a change of a slider of the GUI 100 (G120, G130, G140, and G150).

Second Embodiment

In the first embodiment, at the location decided in the location decision unit 120, held features in the vicinity of the detected feature are searched for, and if there are many held features with low availabilities in the vicinity, availability of the detected feature is decided to be low. In the second embodiment, by further updating a decided availability, it is possible to more reliably exclude features that exert an adverse effect on the calculation of a position/orientation.

Figure 4:
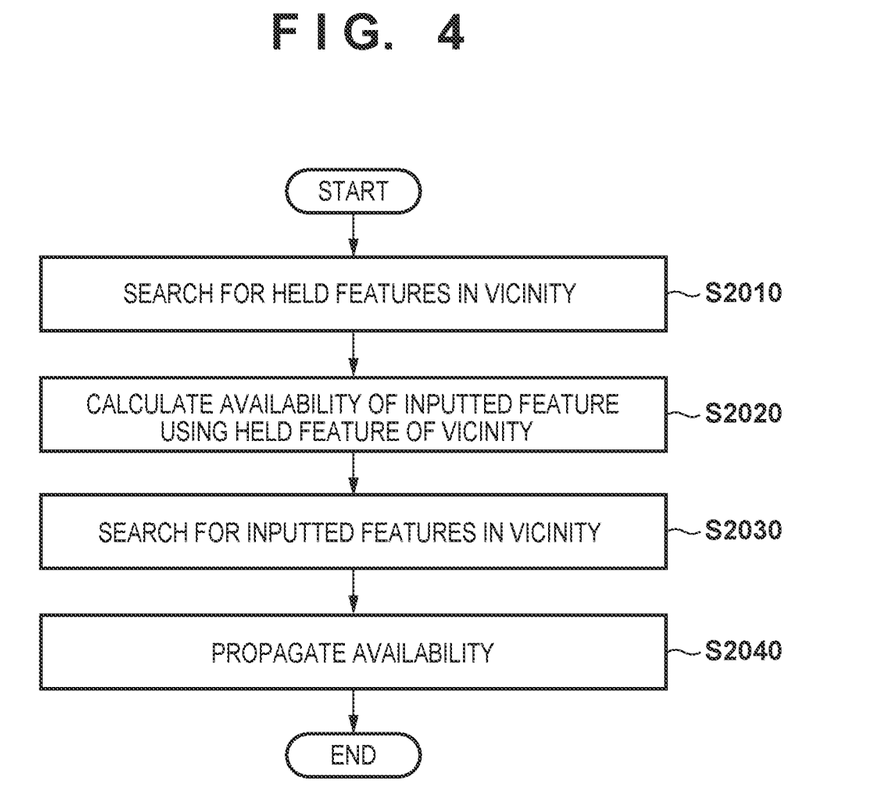
FIG. 4 is a flowchart illustrating a procedure for processing for deciding availability in a second embodiment.

A configuration of the image processing system 101 and the information processing apparatus 1 in the second embodiment is similar to that in the first embodiment (FIG. 1A and FIG. 1B). The processing procedure in the second embodiment is the same as the processing procedure explained by the first embodiment (FIG. 2) except for step S150 (processing for deciding the availability). In step S150, the availability of an input feature is decided based on the location decided in step S140, similarly to in the first embodiment. However, in the second embodiment, propagation of availability is performed. FIG. 4 is a flowchart illustrating detail of a processing procedure for step S150 (processing for deciding availability).

In step S2010, the location decision unit 120 searches for held feature points that are held by the feature hold unit 130 and existing in the vicinity of the respective detected feature point, at the location decided in step S140. In step S2020, if a ratio of held feature points whose availability values are 0 out of the held feature points found in step S2010 is greater than or equal to a threshold value, the location decision unit 120 decides the availability value for the detected feature point as 0, and otherwise decides it as 1. The processing of step S2010 and step S2020 is similar to that in the first embodiment.

In the second embodiment, the location decision unit 120, in step S2030, performs vicinity searching among detected feature points. Similarly to in step S2010, in this vicinity search, feature points whose distance on the image is less than or equal to a threshold value and for which a depth difference is less than or equal to a threshold value are searched for. These threshold values may be the same values as the threshold values used in step S2010, and may be different values. Next, in step S2040, availabilities are caused to propagate to feature points in the vicinity. In processing for propagating an availability, processing, in which availability of one detected feature point is changed to 0 when feature points found in the vicinity of the one detected feature point include a feature point that has an availability of 0, is recursively performed.

By virtue of the second embodiment as described above, based on a result of deciding an availability in accordance with availabilities in the vicinity, the availability is updated by using information in the vicinity of detected feature points. By this, it is possible to stably and with high precision calculate a position/orientation, even in a scene where a moving object that is distributed over a large range exists.

<Variation 2-1>

In the second embodiment, an availability value is given as 0 or 1 similarly to in the first embodiment, but as stated above in a variation of the first embodiment, availability does not need to be binary. For example, a real number value from 0 to 1 may be held as an availability value. In such a case, as stated in the variation 1-4, configuration may be taken so as to set the availability of a detected feature point to 1 when the average value of the availability held by held feature points in the vicinity is greater than or equal to a threshold value, and otherwise the availability is set to 0. However, there is no limitation to this, and configuration may be taken to decide the average of availability values held by held feature points found in the vicinity of a detected feature point as the availability of the detected feature point, when deciding the availability in step S2020, for example. In such a case, in the propagation of availabilities in step S2040, configuration may be taken to recursively cause propagation for setting the availability of detected feature point whose availability is less than or equal to a threshold value to 0. In addition, the availability may be calculated by using a probability propagation method. In addition, in a case of using a non-binary value as an availability value, the availability may be used as a weight when calculating position/orientation in step S160, similar to the method described in a variation of the first embodiment.

Third Embodiment

In the first embodiment and the second embodiment, a decision for availability is performed only for a detected feature point, and there is no change of an availability of a held feature point that is held by the feature hold unit 130. In the third embodiment, the availability of a held feature point is updated based on a result of calculation of a position/orientation. By this, it is possible to calculate a position/orientation with high precision and high stability, even when change occurs such as when an object that was stationary starts moving. Note that, as stated above, the feature hold unit 130 holds coordinates of a three-dimensional position in a predetermined coordinate system (for example, a world coordinate system) for each held feature.

Figure 5:
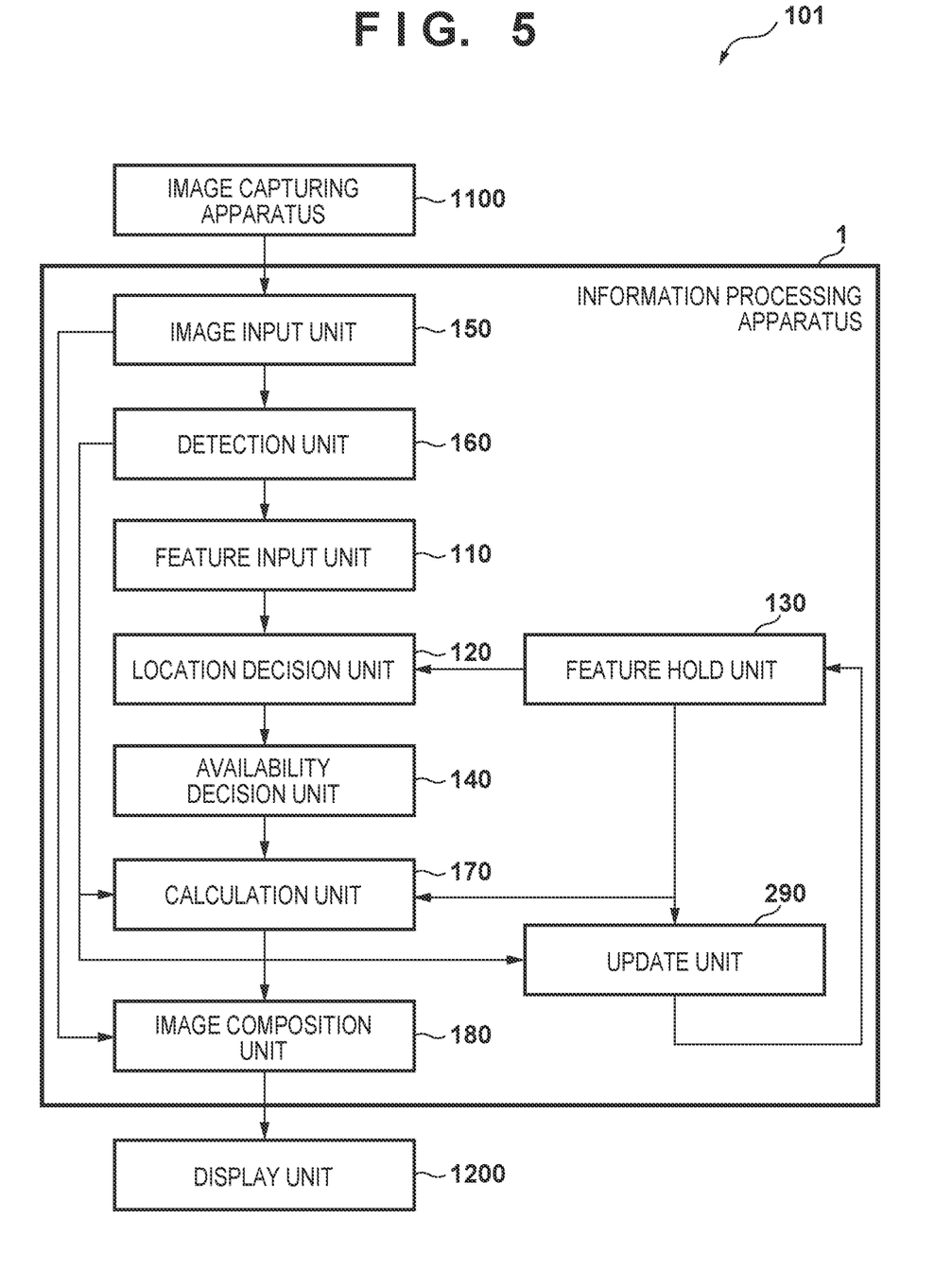
FIG. 5 is a view illustrating an example of a configuration of an information processing apparatus in a third embodiment.

FIG. 5 is a block diagram illustrating an example of a configuration of an image processing system in the third embodiment. In FIG. 5, the same reference numerals are added to configurations that are the same as in the first embodiment (FIG. 1A). Note that a hardware configuration is similar to that in the first embodiment (FIG. 1B). Portions differing between the first embodiment and the third embodiment are that an update unit 290 is added to the information processing apparatus 1, and that the calculation unit 170 is incorporated in the information processing apparatus 1. The update unit 290 updates the availability of a held feature point held by the feature hold unit 130, based on the position/orientation calculated by the calculation unit 170, and the detected feature point detected by the detection unit 160. By this, information of features held by the feature hold unit 130 is updated.

Figure 6:
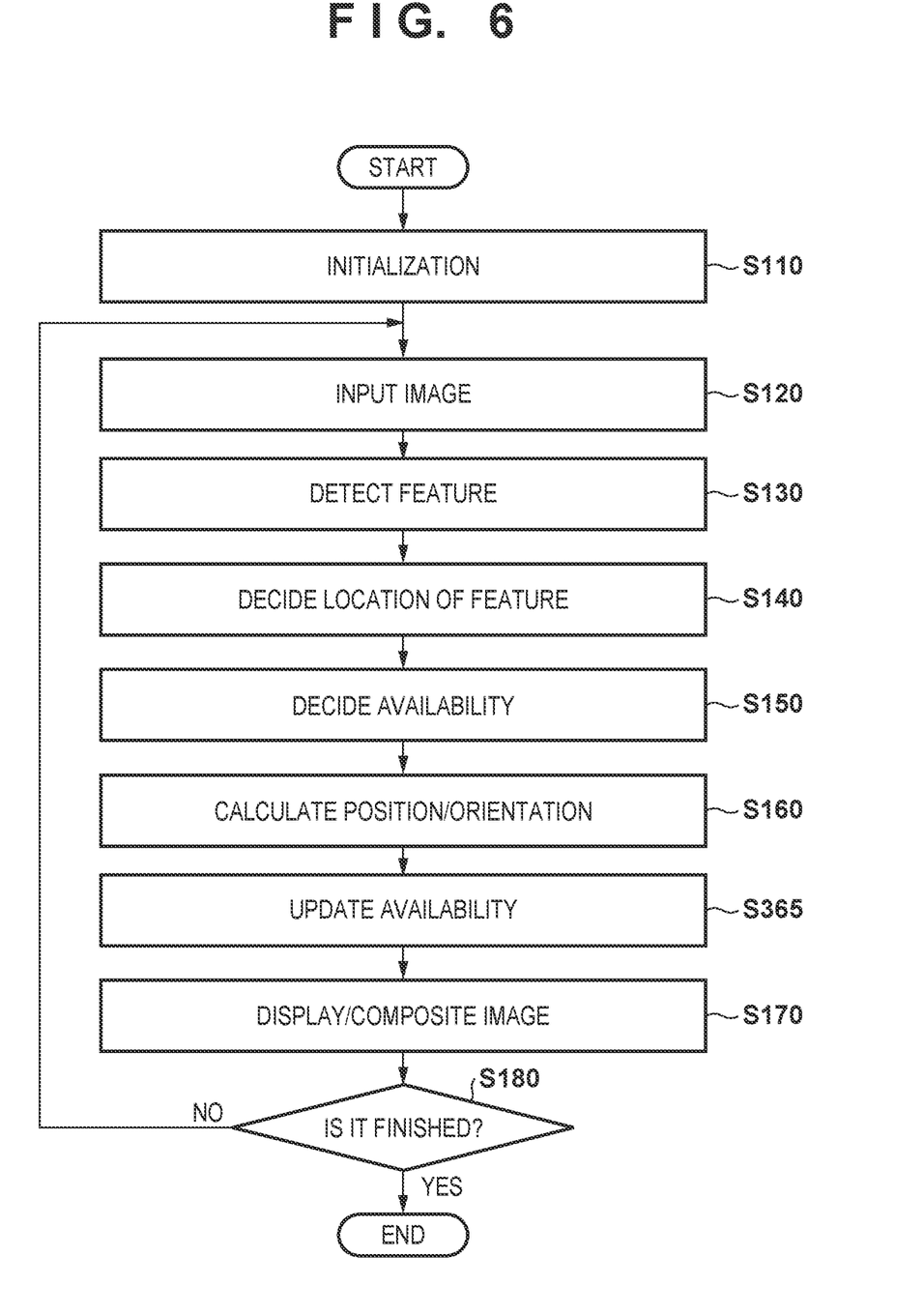
FIG. 6 is a flowchart illustrating a procedure for processing in the third embodiment.
Figure 7:
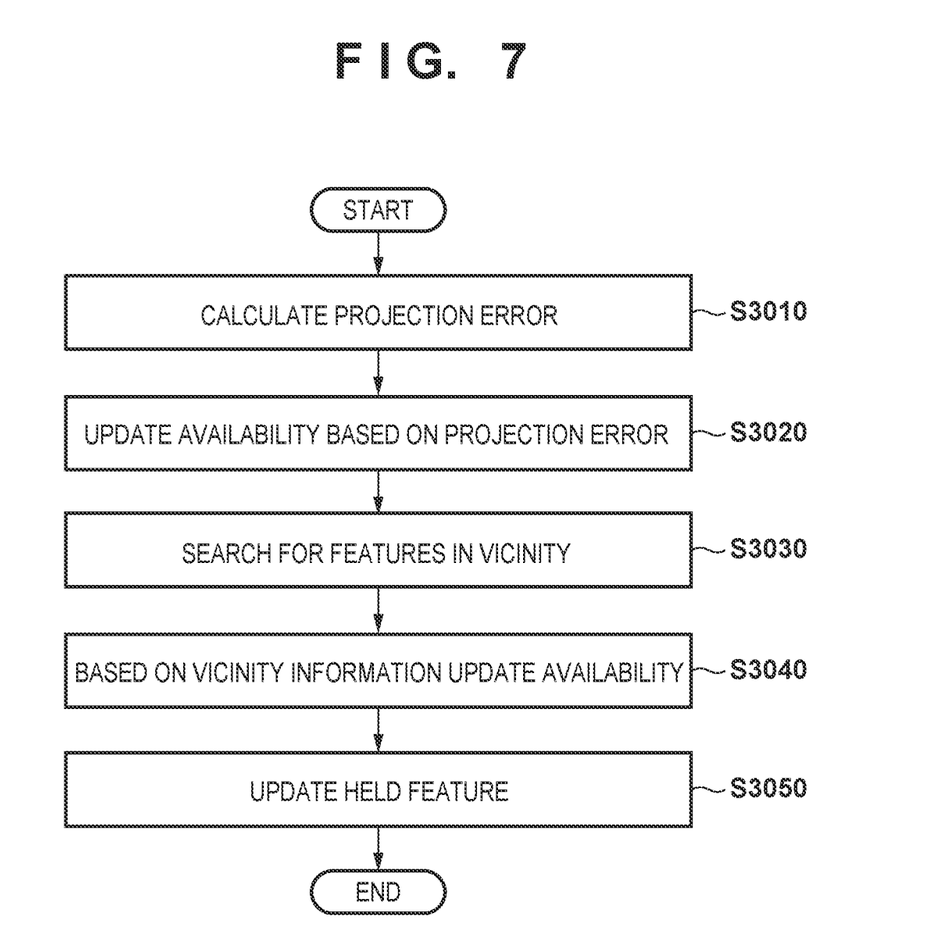
FIG. 7 is a flowchart illustrating a procedure for processing for updating availability in the third embodiment.

FIG. 6 is a flowchart illustrating a procedure for video processing in the third embodiment. In FIG. 6, the same step numbers are added to processing that is the same as in the first embodiment (FIG. 2). The processing of the third embodiment is similar to the processing of the first embodiment except for step S365 (processing for updating availability). In step S365, the update unit 290, based on the result of the position/orientation calculation by the calculation unit 170, updates the availability of held feature points held by the feature hold unit 130 and the detected feature point detected in step S130. FIG. 7 is a flowchart illustrating a procedure for processing in step S365.

In step S3010, the update unit 290 projects the detected feature point onto the coordinate system for held feature points, based on the position/orientation calculated in step S160. The update unit 290 calculates, as a projection error, a Euclidean distance between the three-dimensional position of projected detected feature point, and the three-dimensional position of the held feature point associated with the detected feature point. In step S3020, the update unit 290 updates the availability of the detected feature point based on the projection error calculated in step S3010. Here, if the projection error is less than or equal to a threshold value, the availability of the detected feature point is set to 1, and otherwise it is set to 0. Note that, the availability of a feature point newly detected for a detected feature point for which association with a held feature point was not possible is set to a value such as 1 or 0.5. Also, configuration may be taken to set the availability to 0 in a case such as where a newly detected feature point is predicted to be on a moving object.

In step S3030, the update unit 290 searches for detected feature points in the vicinity of the held feature point, based on the three-dimensional position projected in step S3010. Here, a detected feature whose Euclidean distance to the three-dimensional position of the held feature point is less than or equal to a threshold value is searched for. In step S3040, the update unit 290 updates the availability of the held feature point based on the availability of the detected feature points in the vicinity that are found in step S3030. The method of calculating availability here is a method similar to how the availability of a detected feature point is decided in in step S150 of the first embodiment and the second embodiment, except that the handling of a detected feature point and a held feature point is reversed. In other words, the update unit 290 decides the availability value of a held feature point as 0 if the ratio of detected feature points whose availability value is 0 out of detected feature points found in the vicinity of the held feature point is greater than or equal to a Predetermined threshold value, and otherwise decides it as 1. In step S3050, the update unit 290 inputs to the feature hold unit 130 the information of the detected feature point updated in step S3020 together with the information of the held feature point updated in step S3040 to update the information of a held feature point held by the feature hold unit 130. For example, the availability of the held feature point updated in step S3040 is set as the availability of the held feature point held by the feature hold unit 130. Furthermore, the three-dimensional coordinates of the held feature point may be replaced with the three-dimensional coordinates of the detected feature point calculated from the result of calculating the position/orientation. In addition, a detected feature point for which an associated held feature point does not exist is held in the feature hold unit 130 as a new held feature point.

As described above, in the third embodiment, the availability of a held feature point is updated based on a result of calculation of a position/orientation. By this, it is possible to calculate a position/orientation with high precision and high stability, even when change occurs such as when an object that was stationary starts moving.

<Variation 3-1>

In the third embodiment, an availability value is given as 0 or 1 similarly to in the first embodiment, but as stated above in a variation of the first embodiment, an availability value does not need to be binary, and may be a real number value from 0 to 1, for example. In such a case, for a method of updating the availability for a held feature point, it is possible to apply similar processing to that implemented with respect to detected features in the first embodiment and the second embodiment.

<Variation 3-2>

In the third embodiment, processing for updating availability (step S365) is executed between step S160 (position/orientation calculation processing) and step S170 (image composition/display), but there is no limitation to this. The processing for updating availability of step S365 may be performed by parallel processing, and may be executed anywhere as long as it is in a duration after step S160 and before the next time the information of the feature hold unit 130 is used in the execution of step S140 (processing for deciding feature location).

<Variation 3-3>

In the third embodiment, the update unit 290 updates the availability for both of the held feature point held by the feature hold unit 130 and the detected feature point detected by the detection unit 160, and inputs these availabilities to the feature hold unit 130, but there is no limitation to this. For example, configuration may be taken such that only information of a detected feature point detected by the detection unit 160 is inputted to the feature hold unit 130, and switched with a feature point held by the feature hold unit 130. By this, it is possible to realize odometry processing for successively calculating a position/orientation. In addition, configuration may be taken to update a held feature point held by the feature hold unit 130. In this way, it is possible to exclude, from a target of holding in the feature hold unit 130, information of a feature newly detected that has comparatively high determination error or noise because it is generated from information of only one frame, and it is possible to stably calculate a position/orientation.

As described above, in the first embodiment, configuration is such that a feature whose vicinity includes many features determined to be a feature on a moving object is not used in a position/orientation calculation. By this, it is even more possible to stably and with high precision calculate the position/orientation even in a scene were a moving object exists.

In addition, in the second embodiment, the availability is updated by using information among the vicinity of inputted features, based on a result of deciding availabilities for the vicinity. By this, it is possible to stably and with high precision calculate a position/orientation, even in a scene where a moving object that is distributed over a large range exists.

In addition, in the third embodiment, the availability of a held feature point is updated based on a result of calculation of a position/orientation. By this, it is possible to calculate a position/orientation with high precision and high stability, even when change occurs such as when an object that was stationary starts moving.

Note that, in each foregoing embodiment, a feature point detected from an image as a detected feature that is inputted to the feature input unit 110 is used, but there is no limitation to this, and a detected feature may be anything if it is a feature that can be used in the calculation of a position/orientation. For example, a detected feature may be a feature obtained by detecting a corner from an image, may be a feature obtained by detecting a Lowe (D8) SIFT feature amount, and a SHOT feature may be extracted from three-dimensional data captured by a depth sensor or the like.

The location decision unit 120 may be anything as long as it can decide spatial locations of a detected feature point inputted to the feature input unit 110 and a group of held feature points held by the feature hold unit 130. Matching of a held feature point and a detected feature point may be decided in accordance with feature matching, and may be predicted by using an inertia sensor. In addition, a method of feature matching may be any method as long as it can find an association relationship of whether a detected feature point is the same as a held feature point. For example, configuration may be taken to use association based on normalized cross-correlation, use association of feature amounts, and use feature point tracking that uses, for example, KLT of Tomasi et al. (D9).

The feature hold unit 130 may be anything as long as it is something for holding, for each feature point, an availability value which represents whether usage in a position/orientation calculation of an image capturing apparatus is ok, and geometric information for specifying a position and an orientation. The availability value may be held as binary, or may be held as a real number. In addition, a plurality of availability values may be held.

The availability decision unit 140 may be anything as long as it decides the availability of a detected feature point from a held feature point, based on a location decided by the location decision unit 120. For example, configuration may be taken such that held feature points in the vicinity of a detected feature point are searched for, and the availability of a nearest-neighbor held feature point is decided as the availability of the detected feature point. In addition, for example, the average value of availabilities of held feature points closer than a predetermined distance may be decided as the availability of a detected feature point. In addition, the availability may be set as 0 if a ratio of held feature points (among the held feature points closer than the predetermined distance) whose availability is less than a predetermined value is larger than a predetermined value. In addition, the availability may be decided in accordance with a weighted average inversely-proportional to a distance to a held feature point.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-001434, filed Jan. 6, 2017, which is hereby incorporated by reference herein in its entirety.

What is claimed is:

1. An information processing apparatus, comprising:
at least one memory storing a program; and
one or more processors which, by executing the program, function as:
an input unit configured to input a plurality of detected features that are detected from an image or three-dimensional data;
a holding unit configured to hold a plurality of features of a physical space as a plurality of held features in association with availabilities in a calculation of a position/orientation of an apparatus that obtained the image or the three-dimensional data;
a location deciding unit configured to decide spatial locations of the held features in the image or the three-dimensional data; and
a deciding unit configured to decide, based on the availabilities of the held features existing in a vicinity of one detected feature out of the plurality of detected features at the locations decided by the location deciding unit, a state of usage of the one detected feature in the position/orientation calculation.

2. The apparatus according to claim 1, wherein the deciding unit decides whether usage the one detected feature in the position/orientation calculation is prohibited or allowed.

3. The apparatus according to claim 2, wherein the deciding unit decides the one detected feature as usage prohibited if there are more held features whose availabilities are less than a predetermined value than a predetermined ratio out of the held features in the vicinity of the one detected feature at the locations decided by the location deciding unit.

4. The apparatus according to claim 2, wherein the deciding unit decides the availability of the one detected feature as usage prohibited if there are more held features whose availabilities are usage prohibited than a predetermined ratio among held features in the vicinity of the one detected feature, and otherwise decides the availability of the one detected feature as usage allowed.

5. The apparatus according to claim 2, wherein the deciding unit decides the one detected feature as usage prohibited if an average value of the availabilities of the held features in the vicinity of the one detected feature, at the locations decided by the location deciding unit, is less than a predetermined value.

6. The apparatus according to claim 3, wherein the deciding unit, with regard to each of the plurality of detected features, also changes a detected feature existing in the vicinity of the detected feature decided as usage prohibited based on a held feature in the vicinity to be usage prohibited.

7. The apparatus according to claim 5, wherein the deciding unit changes the one detected feature to usage prohibited if a detected feature decided as usage prohibited exists in the vicinity, and the average value of the availabilities of held features in the vicinity is less than or equal to a predetermined threshold value.

8. The apparatus according to claim 6, wherein the change to usage prohibited for a detected feature by the deciding unit is executed recursively.

9. The apparatus according to claim 2, wherein the one or more processors further function as:
a calculating unit configured to calculate a position/orientation of the apparatus based on a detected feature for which usage is decided as allowed by the deciding unit; and
an updating unit configured to update the availabilities of the plurality of held features based on the position/orientation of the apparatus calculated by the calculating unit.

10. The apparatus according to claim 9, wherein the updating unit
projects the plurality of detected features onto a coordinate system of the held features based on the position/orientation of the apparatus calculated by the calculating unit,
updates the availability of the projected detected features based on a difference between positions of the projected detected features and positions of associated held features, and
updates the availability of one held feature out of the plurality of held features based on the availabilities of detected features existing in the vicinity of the one held feature, at locations of the projected plurality of detected features.

11. The apparatus according to claim 1, wherein the one or more processors further function as:
an image composition unit configured to composite, based on the position/orientation of the apparatus calculated by the calculating unit, an image of a virtual object onto an image that is captured by an image capturing apparatus; and
a display unit configured to display an image resulting from the compositing by the image composition unit.

12. The apparatus according to claim 1, wherein the deciding unit decides a weight representing a contribution of the one detected feature to the position/orientation calculation.

13. The apparatus according to claim 12, wherein the deciding unit decides the weight based on an input from a user.

14. The apparatus according to claim 12, wherein the deciding unit decides the availabilities as the weight.

15. The apparatus according to claim 1, wherein each of the availabilities is binary data.

16. The apparatus according to claim 1, wherein the availabilities represent a degree of usage.

17. The apparatus according to claim 1, wherein the one or more processors further function as:
an obtainment unit configured to obtain the image or the three-dimensional data from the apparatus; and
a detecting unit configured to detect, as the detected feature, an image feature or a three-dimensional feature from the image or the three-dimensional data obtained by the obtainment unit.

18. A method of controlling an information processing apparatus, the method comprising:
inputting a plurality of detected features that are detected from an image or three- dimensional data;
holding in a memory a plurality of features of a physical space as a plurality of held features in association with availabilities in a calculation of a position/orientation of an apparatus that obtained the image or the three-dimensional data;
deciding spatial locations of the held features in the image or the three-dimensional data; and
deciding, based on the availabilities of the held features existing in a vicinity of one detected feature out of the plurality of detected features at the decided locations, a state of usage of the one detected feature in the position/orientation calculation.

19. A non-transitory computer-readable storage medium storing a program for causing a computer to execute a method of controlling an information processing apparatus, the method comprising:
- inputting a plurality of detected features that are detected from an image or three- dimensional data;
- holding in a memory a plurality of features of a physical space as a plurality of held features in association with availabilities in a calculation of a position/orientation of an apparatus that obtained the image or the three-dimensional data;
- deciding spatial locations of the held features in the image or the three-dimensional data; and
- deciding, based on the availabilities of the held features existing in a vicinity of one detected feature out of the plurality of detected features at the decided locations, a state of usage of the one detected feature in the position/orientation calculation.

20. An information processing apparatus, comprising:
- a memory storing a program; and
- one or more processors which, by executing the program, functions as:
- an input unit configured to input a plurality of detected features of a physical space that are detected from an image;
- a holding unit configured to hold availabilities in a calculation of a position/orientation of an apparatus that obtained the image in association with a plurality of held features whose positions in the physical space are known; and
- a deciding unit configured to decide, based on the availabilities of the held features existing in a vicinity of a detected feature out of the plurality of detected features, a state of usage of the detected feature in the position/orientation calculation.

21. A method of controlling an information processing apparatus, the method comprising:
- inputting a plurality of detected features of a physical space that are detected from an image;
- holding availabilities in a calculation of a position/orientation of an apparatus that obtained the image in association with a plurality of held features whose positions in the physical space are known; and
- deciding, based on the availabilities of the held features existing in a vicinity of a detected feature out of the plurality of detected features, a state of usage of the detected feature in the position/orientation calculation.

22. A non-transitory computer-readable storage medium storing a program for causing a computer to execute a method of controlling an information processing apparatus, the method comprising:
- inputting a plurality of detected features of a physical space that are detected from an image;
- holding availabilities in a calculation of a position/orientation of an apparatus that obtained the image in association with a plurality of held features whose positions in the physical space are known; and
- deciding, based on the availabilities of the held features existing in a vicinity of a detected feature out of the plurality of detected features, a state of usage of the detected feature in the position/orientation calculation.

23. An information processing apparatus, comprising:
- at least one memory storing a program; and
- one or more processors which, by executing the program, function as:
- an acquiring unit configured to acquire a first feature in which a position in a real space and an availability for a position estimation of an image capturing apparatus are given to an image feature detected in a first image; and
- a deciding unit configured to decide the availability of a second feature in which the position is given to an image feature detected in a second image captured by the image capturing apparatus, based on the availability of the first feature existing in a vicinity the position of the second feature.

* * * * *